J. HUMBRECHT.
TELESCOPE WITH VARIABLE MAGNIFICATION.
APPLICATION FILED AUG. 20, 1912.

1,091,933.

Patented Mar. 31, 1914.
2 SHEETS—SHEET 1.

J. HUMBRECHT.
TELESCOPE WITH VARIABLE MAGNIFICATION.
APPLICATION FILED AUG. 20, 1912.
1,091,933.
Patented Mar. 31, 1914.
2 SHEETS—SHEET 2.
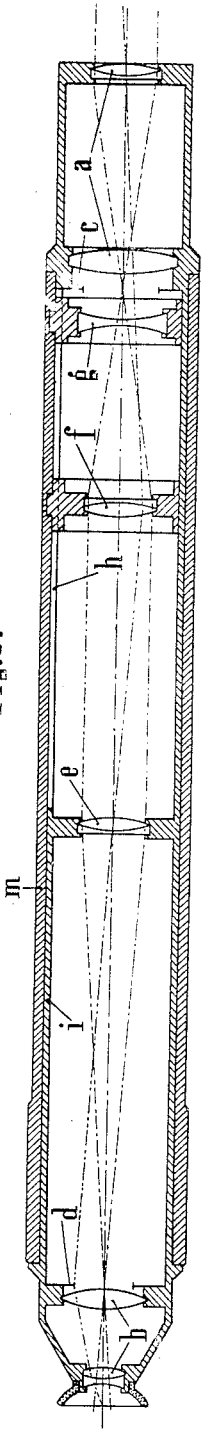
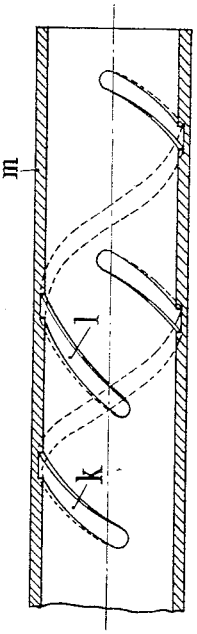
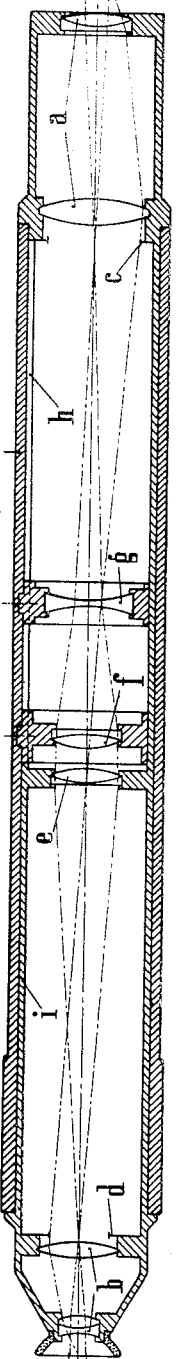

UNITED STATES PATENT OFFICE.

JULES HUMBRECHT, OF GROSS-LICHTERFELDE, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

TELESCOPE WITH VARIABLE MAGNIFICATION.

1,091,933.     Specification of Letters Patent.     Patented Mar. 31, 1914.

Application filed August 20, 1912. Serial No. 715,964.

*To all whom it may concern:*

Be it known that I, JULES HUMBRECHT, a citizen of the German Empire, and resident of Gross-Lichterfelde, near Berlin, Germany, have invented certain new and useful Improvements in and Relating to Telescopes with Variable Magnification, of which the following is a specification.

This invention relates to a telescope with variable magnification having an image reversing system with slidable elements. In the new telescope the image reversing system is provided with three separate elements, two of which being slidable whereas the third element which is nearest to the eye-piece is invariably arranged in such a manner that its setting forms the limiting aperture of the instrument irrespective of the variable position of the movable lenses. The new construction results in an instrument the pupil of emergence of same being invariable with regard to its position and diameter. The observer therefore may keep his eye invariably on the same place for each magnification of the instrument whereby observation is facilitated. In connection with this form of image reversing system it is possible to give the movable lenses such forms that the fixed lens is permanently fed with pencils of parallel rays. This allows inserting of a prism between the fixed element of the reversing system and the slidable elements without causing astigmatism. Such construction of the instrument is especially advantageous if it is intended to provide the instrument with a rotatable entrance reflector as customary in so-called panoramic telescopes for sweeping the horizon. Such instruments requiring the insertion of a so-called erecting prism in the path of rays for compensating for the effect of the rotation of the entrance reflector.

The invention is illustrated on the accompanying drawings where—

Figure 1:
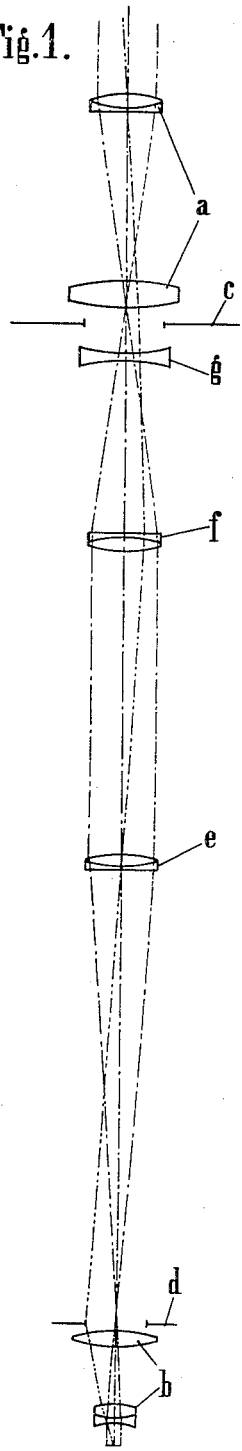
Figure 2:
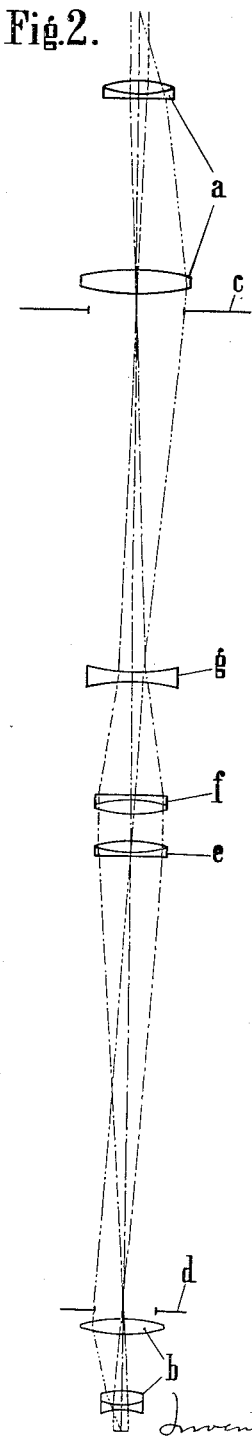

Figures 1 and 2 show the optical elements of a telescope in accordance with the invention for two different magnifications. Figs. 3 to 5 show the optical elements illustrated in Figs. 1 and 2 mounted within suitable tubes.

The two lenses of the objective are designated $a$. The eye-piece lenses are designated $b$. The image plane of the objective is indicated by the reference letter $c$ and the image plane of the eye-piece by the letter $d$. The immovable element of the image reversing system is designated $e$ and the two slidable elements of the image reversing system are designated $f$ and $g$. One of the two slidable elements of the reversing system, namely the element $g$ is shown as negative lens, because such form of the lens is advantageous in so far as it results in a comparatively short length of the instrument. This form of the lens is at the same time advantageous with regard to the construction of instruments giving correct images. The ray diagram in Figs. 1 and 2 shows that the immovable lens $e$ is arranged at or near a point where all the pencils of rays cross each other. Therefore it is essential that lens 3 is formed as an achromatic lens as shown on the drawing.

Figs. 3 to 5 show the optical elements illustrated in Figs. 1 and 2 mounted within suitable tubes; lenses $f$, $g$ adapted to be displaced in dependence from each other so as to secure permanently correct images. To this end the settings of lenses $f$, $g$ are provided with lateral extensions or lugs passing through a longitudinal slot $h$ in the wall of tube casing $i$ and engaging spiral grooves $k$, $l$ of a mantle tube $m$ mounted rotatably on tube $i$. If tube $m$ is rotated on tube $i$ the lenses $f$, $g$ are displaced longitudinally dependent from the pitch of grooves $k$, $l$.

What I claim is:

1. In a telescope with variable magnification an objective, an eye-piece, and a reversing system between same, such reversing system comprising three separate elements, one of same which is nearest to the eye-piece arranged immovably and the two others slidably in dependence from each other, the setting of the immovable lens of the reversing system forming the limiting aperture of the instrument irrespective the variable position of the movable elements.

2. In a telescope with variable magnification an objective, an eye-piece, and a reversing system between same, said reversing system comprising an immovable lens nearest to the eye-piece and two slidably arranged elements of such construction that the immovable lens of the reversing system is permanently fed with pencils of parallel rays.

In testimony whereof I have signed this specification in the presence of two subscribing witnesses.

JULES HUMBRECHT.

Witnesses:
 HENRY HASPER,
 ARTHUR SCHROEDER.